US009938740B1

United States Patent
Nygard et al.

(10) Patent No.: US 9,938,740 B1
(45) Date of Patent: Apr. 10, 2018

(54) THERMALLY INSULATED SPA STRUCTURE

(71) Applicant: MAAX Spas Industries Corp., Chandler, AZ (US)

(72) Inventors: Emil Nygard, Chandler, AZ (US); Steven Yializis, Tucson, AZ (US)

(73) Assignee: MAAX Spas Industries, Corp., Chandler, AZ (US)

( * ) Notice: Subject to any disclaimer, the term of this patent is extended or adjusted under 35 U.S.C. 154(b) by 35 days.

(21) Appl. No.: 15/257,557

(22) Filed: Sep. 6, 2016

Related U.S. Application Data

(60) Provisional application No. 62/213,990, filed on Sep. 3, 2015.

(51) Int. Cl.
| | |
|---|---|
| *E04H 4/00* | (2006.01) |
| *E04H 4/08* | (2006.01) |
| *E04H 4/14* | (2006.01) |
| *B29C 63/04* | (2006.01) |
| *B29C 65/52* | (2006.01) |
| *B29C 44/14* | (2006.01) |
| *B29C 44/12* | (2006.01) |
| *B29C 65/00* | (2006.01) |
| *A61H 33/00* | (2006.01) |
| *B29K 25/00* | (2006.01) |
| *B29K 105/04* | (2006.01) |

(52) U.S. Cl.
CPC ........... *E04H 4/08* (2013.01); *A61H 33/0087* (2013.01); *B29C 44/1228* (2013.01); *B29C 44/14* (2013.01); *B29C 63/04* (2013.01); *B29C 65/522* (2013.01); *B29C 66/7311* (2013.01); *B29C 66/742* (2013.01); *B29C 66/7485* (2013.01); *E04H 4/14* (2013.01); *B29K 2025/06* (2013.01); *B29K 2105/04* (2013.01)

(58) Field of Classification Search
CPC ......... E04H 4/08; E04H 4/14; B29C 44/1228; B29C 44/14
USPC ...................................................... 4/498, 506
See application file for complete search history.

(56) References Cited

U.S. PATENT DOCUMENTS

| | | | | |
|---|---|---|---|---|
| 5,564,137 A | * | 10/1996 | Watkins | A47K 3/022 4/506 |
| 8,028,353 B1 | * | 10/2011 | Hohmann, Jr. | B32B 5/32 156/325 |
| 8,528,211 B2 | * | 9/2013 | Hall | A61H 33/6005 29/453 |

(Continued)

Primary Examiner — Huyen Le
(74) Attorney, Agent, or Firm — Michelle L. Gross, P.C.

(57) ABSTRACT

A spa comprising a layer of copper-containing material, a layer of a cotton-containing material external to the layer of copper-containing material, wherein the layer of copper-containing material and the layer of cotton-containing material are at least partially located between outer spa frame studs, and a layer of at least one of a polyester or a polypropylene-containing material external to the layer of cotton-containing material. The layers of copper-containing material, cotton containing material, and at least one of a polyester or a polypropylene-containing material are located between a spa basin and a spa cabinet. The spa bottom may also have a layer of copper-containing material affixed thereon. In some embodiments, the spa may further comprise an insulated cover with a layer of copper-containing material therein.

20 Claims, 6 Drawing Sheets

(56) References Cited

U.S. PATENT DOCUMENTS

| | | | |
|---|---|---|---|
| 2009/0064405 A1* | 3/2009 | Spicer | A61H 33/0087 4/506 |
| 2013/0328464 A1* | 12/2013 | Hall | E04H 4/14 312/228 |
| 2015/0020304 A1* | 1/2015 | Rabon | E04H 4/08 4/498 |

* cited by examiner

THERMALLY INSULATED SPA STRUCTURE

CROSS REFERENCE TO RELATED APPLICATIONS

This application claims priority under Title 35, United States Code, Section 119(e) to U.S. provisional patent application Ser. No. 62/213,990 filed Sep. 3, 2015, the content of which is hereby incorporated by reference in its entirety.

STATEMENT REGARDING FEDERALLY SPONSORED RESEARCH OR DEVELOPMENT

Not applicable to this application.

BACKGROUND

1. Field of the Invention

Example embodiments in general relate to a spa system that is thermally insulated to prevent heat loss.

2. Related Art

Hot tubs and portable spas (typically used interchangeably to refer to the same thing) are manufactured tubs that can be installed above ground or in-ground and do not necessarily need to remain in the same location. Permanent spas, on the other hand, are typically built in-ground, often accompanying or connected to a swimming pool and therefore, become an integral part of a property's landscape. These non-portable spas are comprised of an interior shell, which is typically made of acrylic or some other synthetic material, and an exterior cabinet, most often made of plastic or insulated real or synthetic wood.

Because of their exposure to outdoor elements, the thermal efficiency of spas is an important factor in measuring the quality and market desirability of each product. Accordingly, manufacturers strive to continuously improve the insulating materials and combinations of layers that comprise the floor, walls, and cover of spa structures.

SUMMARY

An example embodiment of the present invention is directed to a thermally insulated spa structure. The thermally insulated spa structure includes various features that individually or in combination prevent transfer of infrared energy from a spa containing heated water.

There has thus been outlined, rather broadly, some of the features of the thermally insulated spa structure in order that the detailed description thereof may be better understood, and in order that the present contribution to the art may be better appreciated. There are additional features of the thermally insulated spa structure that will be described hereinafter and that will form the subject matter of the claims appended hereto. In this respect, before explaining at least one embodiment of the thermally insulated spa structure in detail, it is to be understood that the thermally insulated spa structure is not limited in its application to the details of construction or to the arrangements of the components set forth in the following description or illustrated in the drawings. The thermally insulated spa structure is capable of other embodiments and of being practiced and carried out in various ways. Also, it is to be understood that the phraseology and terminology employed herein are for the purpose of the description and should not be regarded as limiting.

Embodiments of a thermally insulated spa structure may comprise a layer of copper-containing material, a layer of a cotton-containing material external to the layer of copper-containing material, wherein the layer of copper-containing material and the layer of cotton-containing material are at least partially located between outer spa frame studs, and a layer of at least one of a polyester or a polypropylene-containing material external to the layer of cotton-containing material, the layers of copper-containing material, cotton containing material, and at least one of a polyester or a polypropylene-containing material located between a spa basin and a spa cabinet.

Some embodiments may further comprise at least one of an insulated spa cover and a spa cabinet bottom comprising a copper-containing layer. The insulated spa cover may comprise at least one of a copper-containing layer, an expanded polystyrene layer, a steel layer, and a polyethylene sheeting surrounding the set of layers.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Brief Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35

U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein. Elements and acts in the figures are illustrated for simplicity and have not necessarily been rendered according to any particular sequence or embodiment.

DETAILED DESCRIPTION

Unless otherwise defined, all technical and scientific terms used herein have the same meaning as commonly understood by one of ordinary skill in the art to which this invention belongs. Although methods and materials similar to or equivalent to those described herein can be used in the practice or testing of an insulated spa, suitable methods and materials are described above. All publications, patent applications, patents, and other references mentioned herein are incorporated by reference in their entirety to the extent allowed by applicable law and regulations. The insulated spa may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The features, structures, or characteristics of the invention described throughout this specification may be combined in any suitable manner in one or more embodiments. For example, the usage of the phrases "exemplary embodiments", "some embodiments" or other similar language refers to the fact that a particular feature, structure, or characteristic described in connection with the embodiment may be included in at least one embodiment of the present invention. Thus, appearances of the phrases "exemplary embodiments", "in some embodiments", "in other embodiments" or other similar language, throughout this specification do not necessarily all refer to the same group of embodiments, and the described features, structures, or characteristics may be combined in any suitable manner in one or more embodiments.

As disclosed herein, in some implementations of an insulated spa structure, copper may be used to provide a metalized reflective barrier to heat transfer. While copper may be more expensive than other materials traditionally used for spa insulation such as, for example, aluminum, copper's reflectivity of infrared radiation may be used in combination with other insulating materials to minimize heat transfer from heated water in a spa to the exterior environment, which is typically at a colder ambient temperature.

Figure 1:
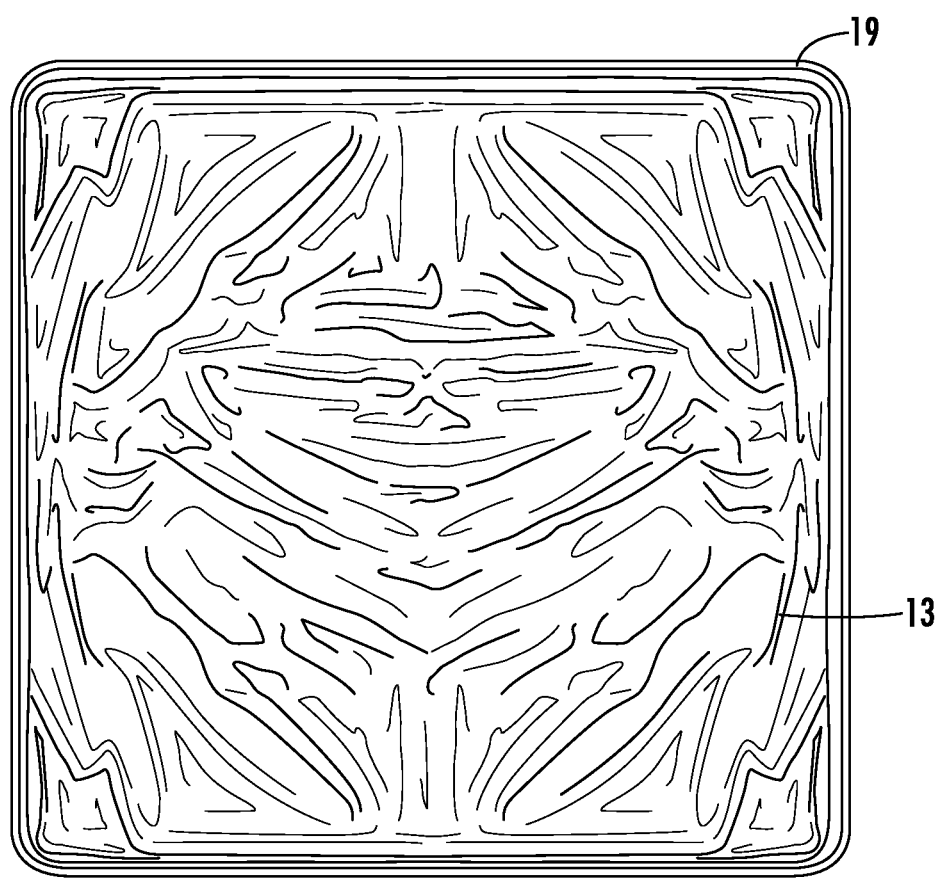
FIG. 1 provides an example of an implementation of an insulated spa bottom.

A spa cabinet 17 is generally comprised of wood or a thermoplastic polymer such as by non-limiting example, acrylonitrile butadiene styrene (ABS). As shown in FIG. 1, which provides a view looking downward into a spa cabinet bottom 19, implementations of an insulated spa structure 10 may comprise a layer of copper-containing material 13 that is affixed or otherwise deposited on a spa cabinet bottom 19 prior to installation of the spa frame 11, basin 16, pumps 20, internal piping 21. While any copper-containing material 13 may be used, in some embodiments, it may be preferable to utilize a copper sheet comprised of a thin copper layer deposited over a polymeric layer such as for example, Copperflect® Product RB3201-80-00375-3200 Series Copper Radiant Barrier, one-side metallized, by Sigma Technologies Intl, LLC. If the bottom 19 of the spa is comprised of a thermoplastic polymer, it may be preferable to use an adhesive spray such a foam adhesive spray, which may preferably be a clear adhesive spray, to affix the copper-containing material 13 to the spa cabinet bottom 19. If the spa cabinet bottom 19 is comprised of wood or another material in which an adhesive spray is undesirable for application of the copper-containing material 13, staples or other fasteners may be used to affix the copper-containing material to the spa bottom 19. In some embodiments, the copper-containing material 13 may be in liquid form and may be sprayed onto the cabinet bottom 19 to form a copper-containing reflective layer when the liquid copper-containing material 13 dries. While pure copper or a mix of copper and other metals or alloys may be used on its own, adding a polymeric layer to the copper is preferable in the environment of a spa so as to prevent corrosion.

Figure 2:
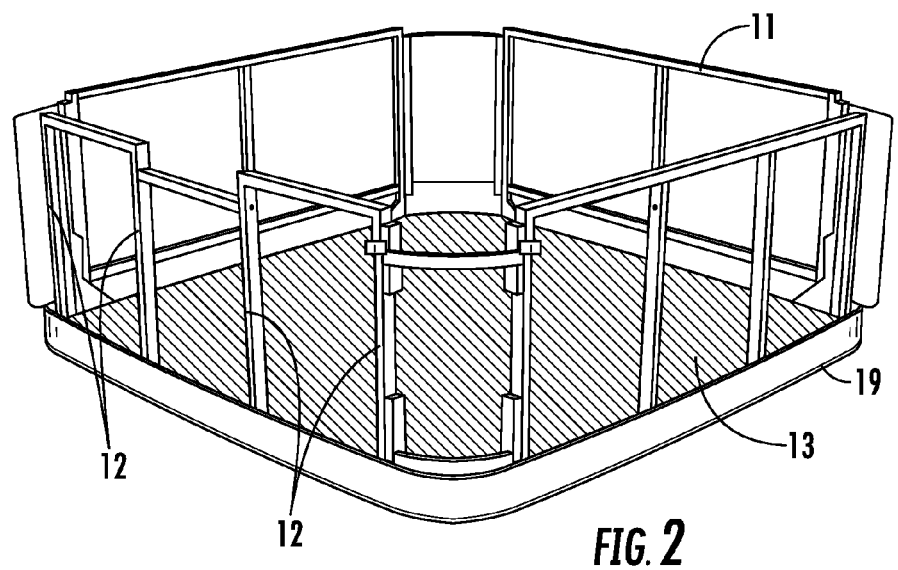
FIG. 2 depicts an exemplary implementation of a spa frame.
Figure 3:
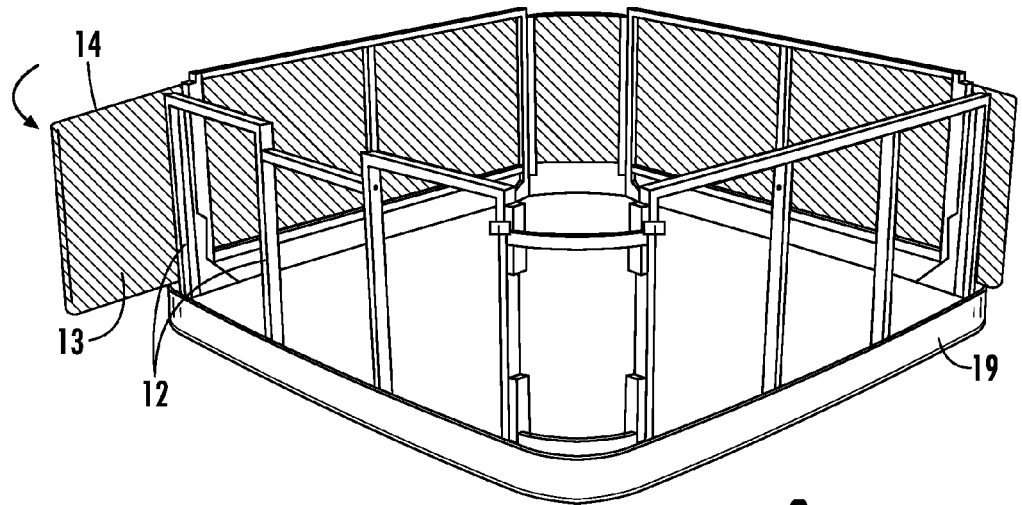
FIG. 3 depicts an application of insulation to a spa frame.

As shown in FIGS. 2-3, a support frame 11 is used to lend structure to the spa cabinet 17 that surrounds the finished spa 10 when it is ready for use. This support frame 11 may be comprised of metal, wood, or any other appropriate material. Multiple layers of insulating material are applied to the frame structure 11 so as to prevent heat loss from the spa when in use. As shown in FIG. 3, a layer of copper-containing material 13 is applied to the frame such that it is inserted at least between the outer studs 12 of the frame 11. In some embodiments, the copper-containing material 13 is coupled to a cotton-containing material 14 such that the two insulating layers comprise a thicker layer that is inserted between the outer frame studs 12 to at least partially surround the frame with the copper-containing layer 13 being located on the side of the thicker layer that is facing inward toward the spa basin 16. While a sheet of pure copper or copper mixed with other metals or alloys may be used to at least partially surround the frame, in some embodiments, it may be preferable to use a copper sheet having a polyethylene terephthalate (PET) laminate with a polyolefin scrim or sealant. This prevents corrosion more effectively than using only a metal layer. Alternatively, a copper-containing material 13 in liquid form may be sprayed to coat a layer of additional insulating material, such as the cotton-containing material 14, to form the copper-containing material layer 13. While the copper-containing material 13 may be used to at least partially surround the frame of the spa without a cotton-containing material 14, the use of the cotton-containing material 14 increases the insulating capability of the overall insulated spa structure. It is contemplated by this disclosure that any material containing cotton may be used, however, in some embodiments, it may be preferable to use a cotton billet layer such as, by non-limiting example, a cotton billet made of recycled materials such as denim. While any appropriate thickness of cotton-containing material 14 may be used, in some embodiments, it may be preferable to use a cotton-containing material 14 having a thickness within a range of about two to three inches. In such a configuration, the copper-containing material 13 reflect infrared radiation while the cotton-containing layer 14 traps heat inside the air space within the spa cabinet 17. The cotton-containing layer 14 and the copper-containing layer 13 may be used in conjunction with a spa cabinet bottom 19 having a copper-containing material 13 on its upward facing side as shown in FIG. 2 or the cotton-containing 14 and copper-containing 13 layers may be used with a spa bottom 19 that does not have a copper-containing material 13 on its cabinet bottom 19 as shown in FIG. 3.

Figure 4A:
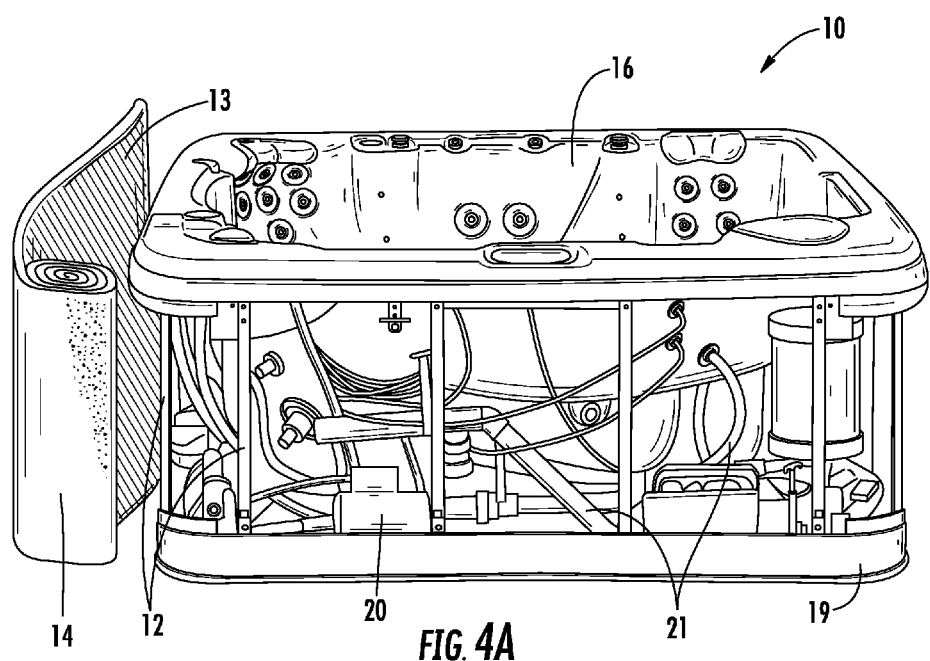
FIGS. 4A-C show installation of insulation on an implementation of a spa having a basin and prior to a cabinet being installed around the spa.
Figure 4B:
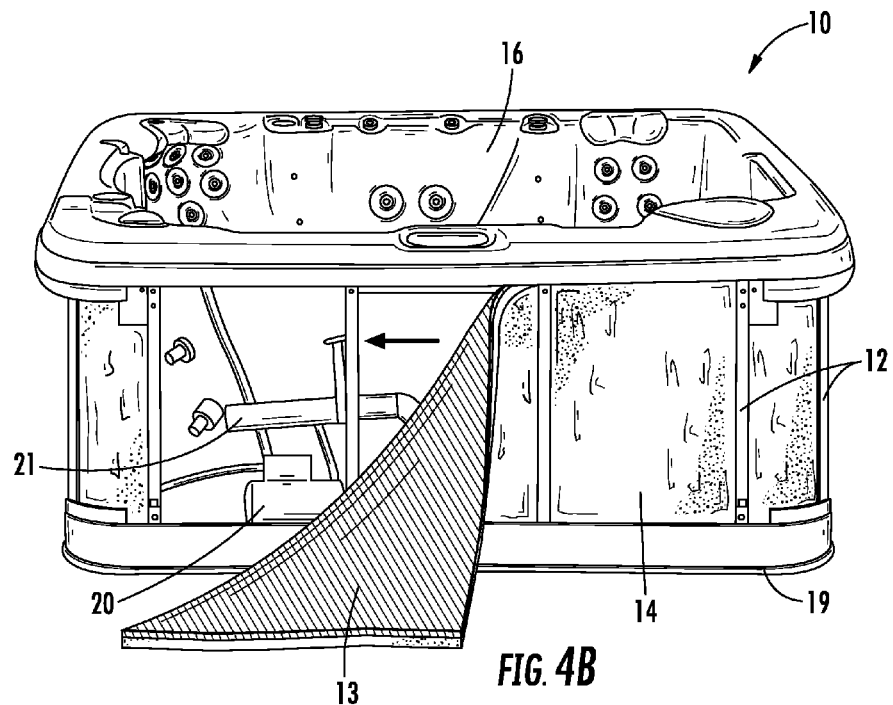
Figure 4C:
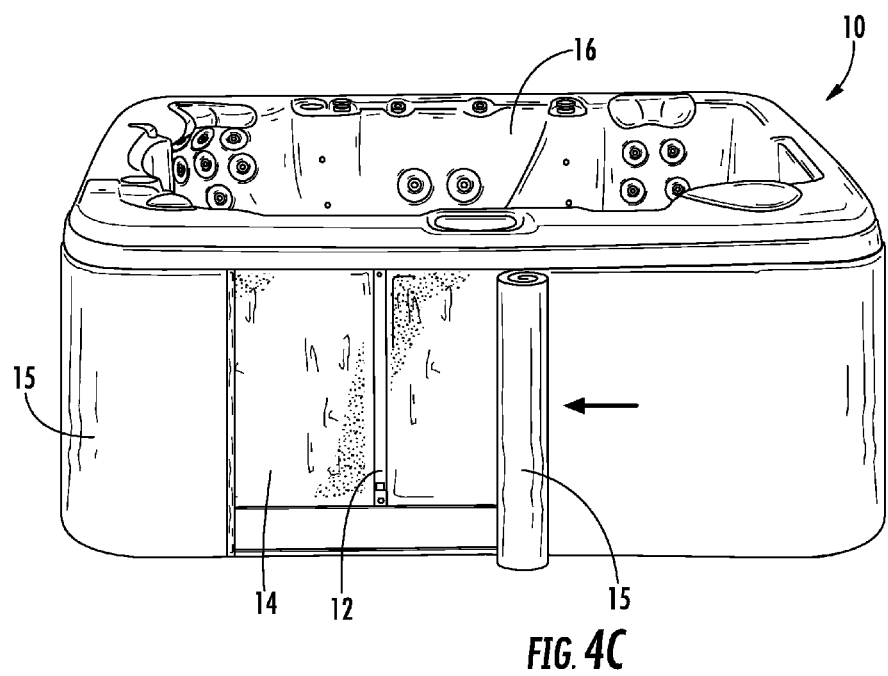

In some embodiments of the insulated spa structure 10, as shown in FIGS. 4A-C, once the cotton-containing layer 14 having a copper-containing layer 13 coupled to a side of the cotton-containing layer 14 facing the spa basin 16 is inserted between the outer spa frame studs 12, the perimeter of the spa is then wrapped with a polyester or polypropylene-containing layer 15, such as for example, Thinsulate® made by 3M Company which has a 65% olefin and 35% polyester fiber blend. The polyester or polypropylene-containing layer 15 is preferably moisture resistant and may be used to fill voids near frame studs and at the top and bottom of the spa cabinet 17. While any appropriate thickness of polyester or polypropylene-containing material 15 may be used, depending upon the cabinet width and the width of other insulating layers, in some embodiments, it may be preferable to use a thickness of about 0.4 to 0.6 inches of polyester or polypropylene-containing material 15. As shown in FIGS. 4A-4C, internal components such as a pump 20 and interior piping 21 remain uninsulated as heat transfer within the insulated core of the spa is desirable. The spa cabinet walls are then installed around the outer perimeter of the spa such that the layers of copper-containing material 13, cotton-containing material 14, and polyester or polypropylene-containing material 15 are within the spa cabinet 14.

Figure 5A:
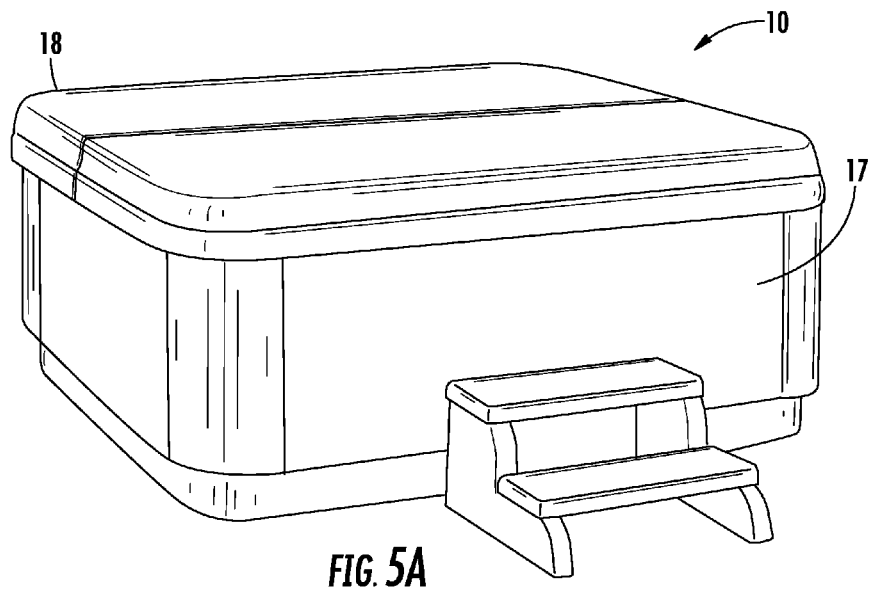
FIG. 5A provides a perspective view of a spa having an insulated cover on top.
Figure 5B:
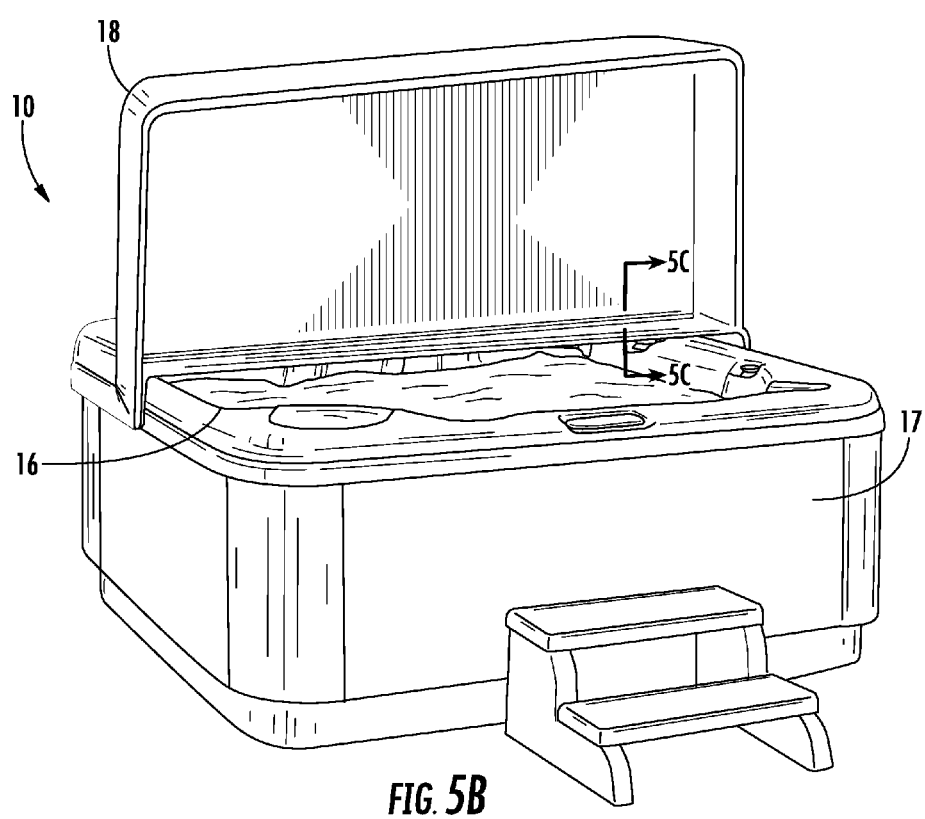
FIG. 5B shows the spa of FIG. 5A having a portion of the insulated cover in a raised position.
Figure 5C:
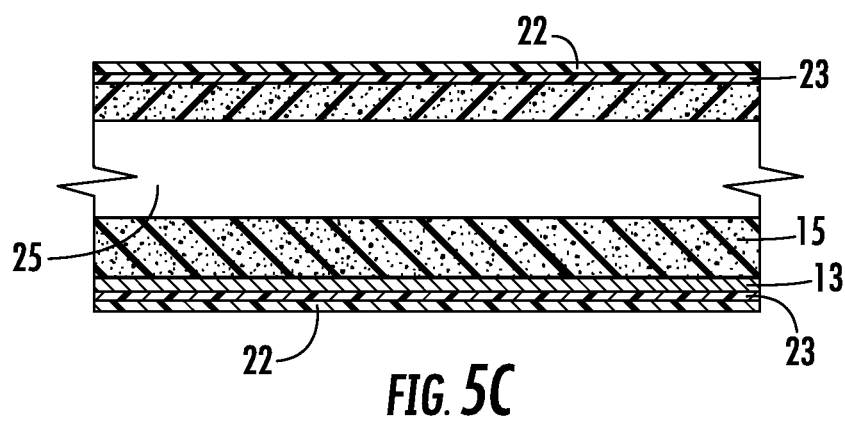
FIG. 5C provides a cross-sectional view of the insulated cover along the line indicated in FIG. 5B.

Covering a spa also makes a significant difference in the rate of heat transfer to the ambient environment. As shown in FIG. 5A, the spa may be covered with an insulated cover 18 that may be hinged to allow portions of the cover 18 to be flipped upward as shown in FIG. 5B. FIG. 5C provides a cross-section of a spa cover 18 in accordance with an embodiment of this disclosure. As shown, the cover 18 is surrounded by an outer layer of a waterproof or water resistant material 22 such as a vinyl sheet which may preferably be of a marine-grade to prevent penetration by water when the cover 18 is in a closed position. A vapor barrier sheet 23 such as, for example, polyethylene sheeting, may then be used to surround the internal layers of the spa cover. While any appropriate vapor barrier 23 may be used, one example of such a vapor barrier 23 may be the Antaeus 2000 product. A C-channel of steel 25 or other rigid material such as a metal or metal alloy provides structure to the cover 18 and forms a base to hold the other layers of the spa cover in place. On each side of the rigid C-channel 25 is a layer of expanded polystyrene 24 which may be relatively thick and have an approximate thickness of one to six inches. While any polystyrene product may be used, it may be desirable to use, by non-limiting example, a product such as Virgin Dura Foam of 1.5 lb. to 2.0 lb. density and a two to four inch thickness. Between the polystyrene layer 24 and the vapor barrier 23 on the side of the spa cover 18 that is closest to the interior of the spa basin 16 when the spa cover 18 is in a closed position lies a layer of a copper-containing material 13 which is used to reflect the heat of the water within the spa basin. While any appropriate copper-containing material 13 may be used such as, by non-limiting example, a sheet of material containing copper or a liquid copper-containing material that is applied in a spray form, in some implementations, it may be desirable to use a copper containing product such as Sigma Technologies Int'l, LLC's PF1201-600 copper film that does not comprise a reinforcing scrim such as that which may be desirable for the copper-containing layer which is applied to an ABS cabinet bottom.

To manufacture some embodiments of an insulated spa cover 18, the copper-containing material 13 may be laminated or otherwise adhered to an expanded polystyrene layer 24 that is two to four inches thick. A steel C-channel 25 is embedded within the expanded polystyrene layer along the center seam for support. The polystyrene and steel C-channel 25 combination may be wrapped with a vapor barrier 23 and heat sealed before inserting this finished billet into a marine grade vinyl encasement 22. In such a configuration, the copper-containing material 13 reflects infrared energy and prevents heat from being transmitted through the expanded polystyrene 24 layers.

In places where the description above refers to particular implementations an insulated spa system, it should be readily apparent that a number of modifications may be made without departing from the spirit thereof and that these implementations may be applied to other to systems and techniques for insulated spa systems.

What is claimed is:

1. A spa comprising:
   a layer of copper-containing material;
   a layer of a cotton-containing material external to the layer of copper-containing material, wherein the layer of copper-containing material and the layer of cotton-containing material are at least partially located between outer spa frame studs; and
   a layer of at least one of a polyester or a polypropylene-containing material external to the layer of cotton-containing material, the layers of copper-containing material, cotton containing material, and at least one of a polyester or a polypropylene-containing material located between a spa basin and a spa cabinet.

2. The spa of claim 1, further comprising a layer of copper-containing material under the spa basin within the spa cabinet.

3. The spa of claim 2, wherein the insulated spa cover comprises a layer of copper-containing material within the insulated spa cover.

4. The spa of claim 3, wherein the insulated spa cover comprises at least one of an expanded polystyrene layer and a steel layer.

5. The spa of claim 4, wherein the insulated spa cover comprises a polyethylene sheeting surrounding the copper-containing material and the at least one of the expanded polystyrene layer and the steel layer.

6. The spa of claim 1, further comprising an insulated spa cover.

7. The spa of claim 1, wherein the copper-containing material comprises a copper layer deposited over a polymeric layer.

8. The spa of claim 1, wherein the layer of copper-containing material under the spa basin is coupled to the spa cabinet bottom using at least one of a spray adhesive and a staple.

9. The spa of claim 1, wherein at least one of a spa pump and an internal pipe remain uninsulated.

10. The spa of claim 1, wherein the layer of copper-containing material is sprayed or adhered onto the layer of cotton-containing material.

11. A method of building a spa comprising:
wrapping a layer of a cotton-containing material having a layer of copper-containing material on a first side such that the layer of copper-containing material faces inward toward a spa basin wherein the layers of cotton-containing material and copper-containing material are at least partially located between outer spa frame studs;
wrapping a layer of at least one of a polyester or a polypropylene-containing material external to the layer of cotton-containing material; and
installing the outer spa cabinet walls over the layers of copper-containing material, cotton containing material, and at least one of a polyester or a polypropylene-containing material located between a spa basin and a spa cabinet.

12. The method of claim 11, further comprising placing a layer of copper-containing material under the spa basin within the spa cabinet.

13. The method of claim 11, further comprising constructing an insulated cover configured to be located on top of the spa.

14. The method of claim 13, further comprising placing a layer of copper-containing material within the insulated spa cover.

15. The method of claim 14, further comprising placing at least one of an expanded polystyrene layer and a steel layer within the insulated spa cover.

16. The method of claim 15, further comprising surrounding the copper-containing material and the at least one of the expanded polystyrene layer and the steel layer of the insulated spa cover with a polyethylene sheeting.

17. The method of claim 11, wherein the copper-containing material comprises a copper layer deposited over a polymeric layer.

18. The method of claim 11, comprising at least one of:
adhering the layer of copper-containing material to the spa cabinet bottom using a spray adhesive; and
coupling the layer of copper-containing material to the spa cabinet bottom using one or more staples.

19. The method of claim 11, wherein at least one of a spa pump and an internal pipe remain uninsulated.

20. The method of claim 11, further comprising spraying or adhering the layer of copper-containing material onto the layer of cotton-containing material.

* * * * *